United States Patent Office 2,865,935
Patented Dec. 23, 1958

2,865,935

2-METHYL STEROIDS AND PROCESS

William P. Schneider, Frank H. Lincoln, and John A. Hogg, Kalamazoo Township, Kalamazoo County, Mich., assignors to The Upjohn Company, Kalamazoo, Mich., a corporation of Michigan No Drawing. Application November 16, 1955
Serial No. 547,310

16 Claims. (Cl. 260—397.45)

The present invention relates to novel steroid compounds and is more particularly concerned with 2-lower-alkyl-11-oxygenated 17α-hydroxyprogesterones selected from the group consisting of 2-lower-alkyl-11β,17α-dihydroxy-4-pregnene-3,20-dione, 2-lower-alkyl-17α-hydroxy-4-pregnene-3,11,20-trione, 2-lower-alkyl-9α-halo-11β,17α-dihydroxy-4-pregnene-3,20-dione and 2-lower-alkyl-9α-halo-17α-hydroxy-4-pregnene-3,11,20-trione wherein the halo atom has an atomic weight between 17 and 131 and wherein the lower-alkyl radical contains from one to eight carbon atoms, inclusive.

The novel compounds of the present invention and the process for their production may be represented by the following formulae:

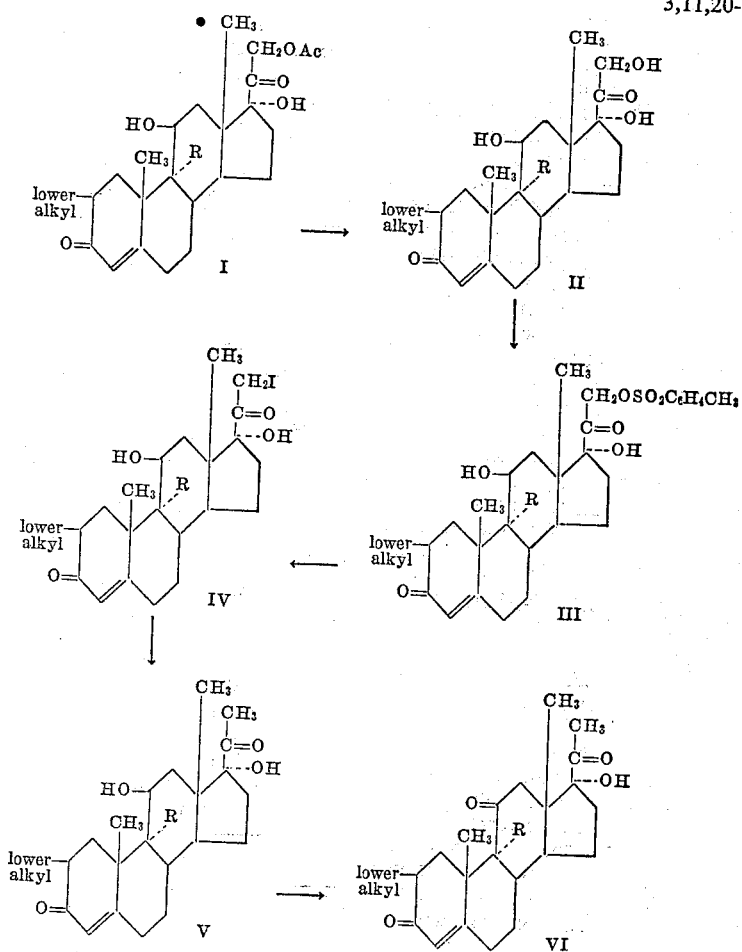

wherein R is selected from the group consisting of hydrogen and halogen of atomic weight between 17 and 131, wherein lower-alkyl contains from one to eight carbon atoms, inclusive, and wherein Ac is the acyl group of an organic carboxylic acid, preferably a hydrocarbon carboxylic acid containing from one to eight carbon atoms, inclusive.

The process of the instant invention comprises reacting a 2-lower-alkyl-11β,17α,21-trihydroxyprogesterone (II), obtainable by hydrolysis of the corresponding 2-lower-alkyl-11β,17α-dihydroxy-21-acyloxy-4-pregnene-3,20-dione (I), with toluenesulfonyl chloride to give the 21-toluenesulfonate of 2-lower-alkyl-11β,17α,21-trihydroxy-4-pregnene-3,20-dione (III).

The thus-obtained 2-lower-alkyl-11β,17α,21-trihydroxy-4-pregnene-3,20-dione 21-toluenesulfonate (III) is thereupon treated with an alkali iodide in acetone solution to produce the 2-lower-alkyl-11β,17α-dihydroxy-21-iodo-4-pregnene-3,20-dione (IV). Treatment of 2-lower-alkyl-11β,17α-dihydroxy-21-iodo-4-pregnene-3,20-dione (IV) with a reducing agent such as zinc and acetic acid, produces 2-lower-alkyl-11β,17α-dihydroxy-4-pregnene-3,20-dione. Oxidation of 2-lower-alkyl-11β,17α-dihydroxy-4-pregnene-3,20-dione with chromic anhydride in acidic solution is productive of 2-lower-alkyl-17α-hydroxy-4-pregnene-3,11,20-trione (VI).

It is an objective of the present invention to provide 2-lower-alkyl-11α,17α-dihydroxy-4-pregnene-3,20-dione, 2-lower-alkyl-17α-hydroxy-4-pregnene-3,11,20-trione, 2-lower-alkyl-9α-halo-11β,17α-dihydroxy-4-pregnene-3,20-dione and 2-lower-alkyl-9α-halo-17α-hydroxy-4-pregnene-3,11,20-trione. It is a further object of the instant invention to produce 2-methyl-11β,17α-dihydroxy-4-pregnene-3,20-dione, 2-methyl-17α-hydroxy-4-pregnene-3,11,20-trione and the 9α-fluoro derivatives thereof. Other objects will be apparent to those skilled in the art to which this invention pertains.

The novel 2-lower-alkyl-11β,17α-dihydroxy-4-pregnene-3,20-diones, the 2-lower-alkyl-17α-hydroxy-4-pregnene-3,11,20-triones and the corresponding 9α-halo compounds especially the 9α-fluoro compounds possess a high order of physiological activity, and possess activity spectra different from the adrenalcortical hormones found in nature such as hydrocortisone and cortisone. The novel synthetic corticosteroid hormones of the present invention possess anti-inflammatory, glucocorticoid, anesthetic, uterine, ovarial and adrenal growth-depressional, and adrenal corticoid activity. The anti-inflammatory activity is especially noticeable in all the steroids of the present invention.

The novel 2-lower-alkyl-11β,17α-dihydroxy-4-pregnene-3,20-diones and 2-lower-alkyl-17α-hydroxy-4-pregnene-3,11,20-trione are useful in oral compositions as well as in topical applications. In oral compositions the material may be given as tablets illustratively using either polyethylene glycol 4000 or 6000 as a carrier or lactose and/or sucrose and a diluent. The novel 2-lower-alkyl-11β,17α-dihydroxy-4-pregnene-3,20-dione, 2-lower-alkyl-17α-hydroxy-4-pregnene-3,11,20-trione and their 9α-halo derivatives are especially useful for topical application as ointments, lotions, jellies, creams, aqueous suspension etc. Examples of especially advantageous topical preparations of suitable compositions are given below. The examples are to the 2-methyl-11β,17α-dihydroxy-4-pregnene-3,20-dione and 2-methyl-17α-hydroxy-4-pregnene-3,11,20-trione as well as the 9α-fluoro derivatives thereof; however, equivalent amounts of the other 2-lower-alkyl homologues and corresponding 9α-chloro, bromo or iodo analogs of this invention respectively are substitutable therein.

A suitable dermatological and ophthalmic ointment has the following composition:

| | Lbs. |
|---|---|
| Wool fat, USP | 100 |
| Mineral oil, USP | 125 |
| 2-methyl-11β,17α-dihydroxy-4-pregnene-3,20 - dione (micronized) | 7 |
| White petrolatum, USP | 500 |

Incorporation of an antibiotic in the ointment, especially neomycin sulfate, has therapeutic advantages each active ingredient potentiating and supplementing the useful properties of the other. Such an ointment is as follows:

| | Lbs. |
|---|---|
| Wool fat, USP | 100 |
| Mineral oil, USP | 125 |
| Neomycin sulfate | 3 |
| 2-methyl-9α-fluoro-11β,17α-dihydroxy-4-pregnene - 3,20-dione (micronized) | 3.5 |
| White petrolatum, USP | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steroids of the present invention in preparations such as the above ointments.

The compounds of the instant invention, 2-methyl-11β,17α-dihydroxy-4-pregnene-3,20 - dione, the 11 - keto compounds and the corresponding 9α-halo derivatives are also useful as starting materials for the preparation of other physiological important compounds. For example, 11β,17β-dihydroxy-2,17α-dimethyl-4-androstene-3-one can be produced from 2-methyl-11β,17α-dihydroxy-4-pregnene-3,20 dione by reduction in aqueous methanol solution with sodium borohydride to obtain first the 2-methyl-3α,11β,17α,20-tetrahydroxy-4-pregnene, splitting off the side-chain by using periodic acid, or by a microbiological fermentation procedure employing fungi of the genus Penicillium, for example, Penicillium lilacinum, or fungi of the genus Gliocladium, for example, the species Gliocladium catenulatum, to give 2-methyl-3,11β-dihydroxy-4-androstene-17-one which by treatment with methyl magnesium bromide produces the 2,17 - dimethyl-3,11β,17β-trihydroxy-4-androstene which by oxidation with manganese dioxide produces 11β,17β-dihydroxy-2,17-dimethyl-4-androstene-3-one of high anabolic activity.

The starting materials in the instant invention, 2-lower-alkyl-11β,17α,21-trihydroxy-4-pregnene-3,20-diones and 2-lower-alkyl-17α,21-dihydroxy-4-pregnene- 3,11,20 - triones are obtained by hydrolysis of the respective 21-organic carboxylic acid esters (Preparations 1–8) thereof. To obtain the above named free steroid alcohols the selected 2-lower-alkyl-11β,17α-dihydroxy-21-acyloxy -4- pregnene - 3,20-dione, 2-lower-alkyl-17α-hydroxy-21-acyloxy-4-pregnene-3,11,20-trions or the 9α-halo derivatives thereof are subjected to acid or basic hydrolysis. In case of an acid hydrolysis which is preferred for those 2-lower-alkyl-11β,17α-dihydroxy-4-pregnene-3,20-diones possessing in the 9α-position a chloro, bromo, or iodo compound, the compound is dissolved in an organic solvent such as methanol, ethanol, propanol, tertiary butyl alcohol, dimethanol, ethanol, propanol, tertiary butyl alcohol, dioxane, acetone, dimethyl formamide, or the like, in the presence of some water, and treated with a small quantity of a strong mineral acid such as hydrochloric, sulfuric, chloric, perchloric, or a strong benzene-sulfonic acid such as toluenesulfonic acid, chlorobenzene-sulfonic acid, β-naphthylsulfonic acid, or the like. The reaction is effected at a temperature between zero degrees and the boiling point of the reaction mixture, preferably between room temperature and a slightly elevated temperature such as 45 to 50 degrees centigrade. The proportion of mineral acid in the solvent is usually low and varies between 0.25 to five parts of acid for 100 parts of solvent by weight. The time of reaction varies between one hour and 120 hours depending on the concentration of acid, the temperature at which the reaction is carried out and the type of acyl group to be removed. Mild conditions are preferred since high temperatures and high acid concentration produce partial dehydration of the 11β-hydroxyl group. After the reaction is terminated the material is isolated by a standard procedure such as pouring the reaction mixture in excess of water, neutralizing and collecting the precipitate of material on a filter.

Purification of the thus produced crude 2-lower-alkyl-11β,17α,21-trihydroxy-4-pregnene-3,20-dione is achieved by conventional means such as extracting the impurities, chromatography or recrystallization using organic solvents such as methyl alcohol, ethyl alcohol, Skellysolve B hexanes, acetone, benzene, chloroform, dichloroethylene, methylene chloride, mixtures of these or the like, as deemed convenient.

Hydrolysis of the 2-lower-alkyl-11β,17α,21-trihydroxy-4-pregnene-3,20-dione 21-acylate, 9α-fluoro derivatives thereof, the 2-lower-alkyl-11β,17α-dihydroxy-4-pregnene-3,11,20-triones 21-acylates and 9α-halo derivatives thereof, can be performed in a basic medium. In this case the selected steroid is dissolved in an organic solvent, preferably an organic solvent miscible with water such as methanol, ethanol, propanol, tertiary butyl alcohol, dioxane, or the like, and thereto is added a base such as sodium hydroxide, potassium hydroxide, calcium or barium hydroxide, aqueous ammonia, potassium or sodium bicarbonate, potassium or sodium carbonate, or the like. In the preferred embodiment of the invention the steroid solution is protected from atmospheric oxygen by using an atmosphere of nitrogen during the reaction. The solution is first saturated with nitrogen gas before the addition of the base. The preferred bases are the milder ones such as sodium bicarbonate or potassium bicarbonate. The reaction is suitably performed at room temperature, that is between fifteen to thirty degrees centigrade; however, higher or lower temperatures are operative. The time for the reaction is between one-half hour to 24 hours depending on the temperature selected, the amount of base selected, and depending on the type of acyl radical on the 21-position of the selected steroid. The proportion of base used is usually in excess of that theoretically required, i. e., one mole of base per mole of steroid ester. However, to prevent undesirable side reactions the proportion of base used is generally restricted to between one mole of steroid to one mole of base and about three moles of base to one mole of steroid. After the reaction is terminated, the solution is neutralized with an acid, such as dilute hydrochloric, dilute sulfuric, or acetic acid and the product is thereupon removed by conventional procedures such as extraction, evaporating the solvent and washing the residue thus obtained with water to remove water-soluble salts, or drowning the reaction mixture in excess of water and refrigerating the aqueous reaction mixture to collect the resulting solid precipitatde. The solid precipitate is purified by conventional means such as recrystallization, extraction of impurities or chromatography using organic solvents such as acetone, Skellysolve B hexanes, ethyl acetate, methanol, ethanol, dioxane, or the like, as deemed necessary.

In carrying out the process of the present invention, 2-lower-alkyl-11$\beta$,17$\alpha$,21-trihydroxy-4-pregnene-3,20-dione or the 9$\alpha$-halo derivative thereof is esterified with an organic sulfonic acid such as toluenesulfonyl chloride, benzenesulfonyl chloride, methanesulfonyl chloride, substituted benzenesulfonyl chloride, such as ortho-, meta-, or para-chlorobenzenesulfonyl chloride, the ortho-, meta-, or para-nitrobenzenesulfonyl chloride, benzenesulfonyl chlorides substituted by other halo, nitro, methoxy, ethoxy, and the like groups, or the like, with toluenesulfonyl chloride preferred. The esterification is carried out in solution using pyridine or neutral solvents such as benzene, toluene, chloroform or the like as the solvent. The amount of reactant, an organic acid sulfonyl chloride, is used in a ratio of one or 1.2 moles of organic sulfonyl halide to one mole of steroid. Smaller or larger proportions of reagent may be used and are operative. The organic sulfonyl chloride is generally added dropwise in a solvent such as methylene chloride, benzene, chloroform, carbon tetrachloride, or the like, while stirring the reaction mixture which is kept at low temperature illustratively between minus twenty to plus ten degrees centigrade. After all the organic sulfonic acid halide has been added, the reaction mixture is refrigerated to between minus twenty and plus ten degrees centigrade for a period between one and 48 hours. Thereafter the product a 2-methyl-11$\beta$,17$\alpha$-dihydroxy-21-organic sulfonyloxy-4-pregnene-3,20-dione is isolated by conventional means, such as by pouring the reaction mixture into excess of water, extracting with an organic solvent immiscible with water, such as benzene, chloroform, carbon tetrachloride, dichloroethylene, methylene chloride, ether, or the like, drying the organic layer containing the steroid, evaporating the solvent and purifying the residue in conventional manner, such as by recrystallization, chromatography, or the like, as deemed necessary. For the subsequent reaction it is not imperative to purify the 21-organic acid sulfonate of the thus obtained 2-methyl-11$\beta$,17$\alpha$,21-trihydroxy-4-pregnene-3,20-dione. The crude product may be used for the subsequent reaction.

The organic acid sulfonate of 2-lower-alkyl-11$\beta$,17$\alpha$,21-trihydroxy-4-pregnene-3,20-dione, dissolved in acetone, is thereupon treated with an excess of alkali metal iodide usually from two to five moles of sodium, potassium or lithium iodide per mole of the steroid 21-organic acid sulfonate. The reaction mixture is heated with stirring for a period of from five to sixty minutes and thereupon evaporated at reduced pressure. The thus obtained crude material may be used in the subsequent reduction reaction or may be purified by recrystallization from organic solvents such as acetone, ethanol, methanol, Skellysolve B hexanes, or the like, to give pure 2-lower-alkyl-11$\beta$,17$\alpha$-dihydroxy-21-iodo-4-pregnene-3,20-dione.

For the reduction procedure either the crude or the recrystallized 2-lower-alkyl-11$\beta$,17$\alpha$-dihydroxy-21-iodo-4-pregnene-3,20-dione compound is reduced with a reducing agent such as zinc and acetic acid, sodium or potassium sulfite, sodium or potassium hydrosulfite, sodium or potassium thiosulfate, or the like. In the preferred embodiment, acetic acid and zinc are used, the acetic acid simultaneously acting as solvent. In carrying out the reduction, the 21-iodo steroid is slurried with acetic acid and after being stirred for a period of ten minutes to one hour, powdered zinc in a quantity of two to ten moles per mole of steroid is added. The mixture is thereupon stirred for a period between five and 60 minutes and excess zinc removed by filtration. From the filtrate is isolated the corresponding 2-lower-alkyl-11$\beta$,17$\alpha$-dihydroxy-4 pregnene-3,20-dione by conventional means, e. g., neutralizing the solution with a base, such as aqueous solutions of sodium bicarbonate, potassium bicarbonate, sodium hydroxide, potassium hydroxide, ammonia, or the like, extracting the mixture with a water-immiscible solvent such as methylene chloride, dichloroethylene, carbon tetrachloride, chloroform, ether, benzene, toluene, or the like, and evaporating the extracts to obtain crude 2-lower-alkyl-11$\beta$,17$\alpha$-dihydroxy-4-pregnene-3,20-dione. The crude crystalline material may be purified by conventional means such as recrystallization, additional extractions of impurities, or chromatography as deemed necessary.

The thus obtained 2-methyl-11$\beta$,17$\alpha$-dihydroxy-4-pregnene-3,20-dione, if so desired, is converted to 2-methyl-17$\alpha$-hydroxy-4-pregnene-3,11,20-trione by oxidation with chromic acid in either a homogeneous or heterogeneous medium. In a homogeneous medium the reaction is carried out by dissolving the selected steroid in acetic acid and adding chromic acid in the theoretical calculated quantity or in a slight, up to ten or twenty percent, excess of the amount of chromic acid calculated. Water present in commercial grades of acetic acid may be sufficient for chromic acid produced oxidation, otherwise if high-grade glacial acetic acid has been used, five to ten percent of water should be added. The reaction is usually carried out at a temperature between zero and thirty degrees with temperatures between five and fifteen degrees preferred. Higher or lower temperatures are, however, operative. Dependent upon the temperature the time of reaction in the preferred condition is between two and six hours. Agitation is usually used and is preferred in the instant procedure.

Using a heterogeneous medium for the oxidation, the steroid is suitably dissolved in a water-immiscible solvent such as ether, benzene, toluene, carbon tetrachloride with benzene generally preferred, and is reacted under continuous agitation with an aqueous sulfuric acid solution of sodium or potassium dichromate. The amount of alkali dichromate employed is from one half to five moles per mole of steroid, with larger or smaller amounts being operative. The temperature of reaction is preferably between fifteen and thirty degrees; however, lower and higher temperatures are operative. The reaction time varies between one and twelve hours depending on the temperatures of reaction employed. After the reaction is terminated, the aqueous layer is separated from the organic layer, the organic layer is washed repeatedly with alkali solutions such as aqueous sodium bicarbonate, sodium carbonate, potassium carbonate, sodium hydroxide or potassium hydroxide, and the like, thereupon with water, dried, evaporated and the thus obtained crude product may be purified by recrystallization from Skellysolve B hexanes, ethyl acetate, acetone, methyl alcohol, ethyl alcohol, mixtures of these, or the like, or by chromatography as deemed necessary.

Instead of undertaking the oxidation as the last step of the present process the oxidation can be performed as the first step before the hydrolysis, in which case the starting material, a 2-lower-alkyl-11$\beta$,17$\alpha$-dihydroxy-21-acyloxy-4-pregnene-3,20-dione, is first converted to the corresponding 2-lower-alkyl-17$\alpha$-hydroxy-21-acyloxy-4-pregnene-3,11,20-trione. The oxidation of 2-lower-alkyl- 11β,17α-dihydroxy-21-acyloxy-4-pregnene-3,20-dione is performed in the same manner as shown for the 21-desoxy compound (cf. preparation).

The following examples are illustrative of the process and products of the present invention, but are not to be construed as limiting.

PREPARATION 1

*2-glyoxalation of 11β-hydroxy-21-acetoxy-4,17(20)-pregnadiene-3-one*

A solution of 18.62 grams (0.05 mole) of 11β-hydroxy-21-acetoxy-4,17(20)-pregnadiene-3-one was prepared in 300 milliliters of dry tertiary butyl alcohol by heating the mixture at seventy degrees centigrade. The solution was cooled to 55 degrees centigrade and to the stirred solution, protected from atmospheric oxygen by bubbling nitrogen therethrough, was added 11.5 grams (0.10 mole) of methyl oxalate followed by a solution of 4.05 grams (0.075 mole) of sodium methoxide dissolved in sixteen milliliters of methanol. A thick, pale yellow precipitate soon appeared. Stirring was continued for ten minutes and the mixture was then diluted with 300 milliliters of anhydrous ether. Stirring was continued for an additional fifteen minutes and the mixture then filtered. The pale yellow-green precipitate was washed and dried at room temperature in a vacuum. The yield of about 24 grams of precipitate consisted primarily of a sodium enolate of 2-methoxyoxalyl-11β-hydroxy-21-acetoxy-4,17(20)-pregnadiene-3-one.

The precipitate was dissolved in 250 milliliters of water and the solution acidified with dilute hydrochloric acid. The resulting precipitate was collected by filtration, washed with water and dried. There was thus obtained 18.71 grams of an amorphous powder consisting essentially of 2-methoxyoxalyl-11β-hydroxy-21-acetoxy-4,17(20)-pregnadiene-3-one which melted at eighty to 95 degrees centigrade and which gave a positive red-brown ferric chloride test.

PREPARATION 2

*2-formylation of 11β-hydroxy-21-acetoxy-4,17(20) pregnadiene-3-one*

A mixture of 150 milliliters of dry benzene and a solution of 8.10 grams (0.015 mole) of sodium methoxide in 33 milliliters of methanol was distilled in a nitrogen atmosphere until sixty milliliters of distillate was collected. The remaining suspension of sodium methoxide in benzene was cooled to fifty degrees centigrade and 18.5 grams (0.25 mole) of ethyl formate was then added. After stirring the mixture for fifteen minutes, a solution of 3-keto-11β-hydroxy-21-acetoxy-4,17(20)-pregnadiene-3-one in 300 milliliters of dry benzene at fifty degrees centigrade was rapidly added thereto. The temperature of the mixture was gradually reduced to about 25 degrees centigrade while stirring was continued for one hour. There was then added 250 milliliters of anhydrous ether followed by further stirring for an additional hour whereafter another 250-milliliter portion of ether was added and the mixture was maintained at about 25 degrees centigrade for about sixteen hours. The resulting precipitate, consisting essentially of the sodium enolate of 2-formyl-11β-hydroxy-21-acetoxy-4,17(20)-pregnadiene-3-one first appeared as a gum but solidified upon standing. To the stirred mixture was then added 500 milliliters of water and the stirring contiued until all of the solid had dissolved. The aqueous layer was separated, washed with ether and then acidified with dilute hydrochloric acid. The resulting precipitate was collected by filtration, washed with water and dried. There was thus obtained 12.14 grams of a mixture consisting essentially of 2-formyl-11β-hydroxy-21-acetoxy-4,17(20)-pregnadiene-3-one which melted at 110 to 123 degrees centigrade and which gave a positive deep violet ferric chloride test.

Following the procedure described in Preparation 2, other 21-esters of 2-formyl-11β,21-dihydroxy-4,17(20)-pregnadiene-3-one are prepared by substituting the corresponding 21-ester of 11β,21-dihydroxy-4,17(20)-pregnadiene-3-one as the starting steroid of the reaction described in Preparation 2. Examples of 2-formyl-11β-hydroxy-21-acyloxy-4,17(20)-pregnadiene-3-ones thus prepared include those wherein the acyl group is the acyl radical of a lower-aliphatic acid, e. g., formic, propionic, butyric, isobutyric, valeric, isovaleric, trimethylacetic, hexanoic, heptanoic, diethylacetic, triethylacetic and octanoic.

PREPARATION 3

*2-methyl-2-methoxyoxalyl-11β-hydroxy-21-acetoxy-4,17(20)-pregnadiene-3-one*

A mixture of 4.70 grams of crude 2-methoxyoxalyl-11β-hydroxy-21-acetoxy-4,17(20)-pregnadiene-3-one, obtained according to the method of Preparation 1, ten grams of anhydrous potassium carbonate, fifteen milliliters of methyl iodide and 100 milliliters of acetone was stirred at about 25 degrees centigrade for forty hours. Water was then added and the mixture extracted thoroughly with methylene chloride. The extract was washed with water, dried and the solvent distilled to leave a glassy residue consisting essentially of 2-methyl-2-methoxyoxalyl-11β-hydroxy-21-acetoxy-4,17(20)-pregnadiene-3-one.

Similarly, other 2-lower-alkyl-2-alkoxyoxalyl-11β-hydroxy-21-acyloxy-4,17(20)-pregnadiene-3-ones are prepared by reacting a 2-alkoxyoxalyl-11β-hydroxy-21-acyloxy-4,17(20)-pregnadiene-3-one with an alkyl halide, e. g., methyl bromide, ethyl bromide, propyl bromide, butyl bromide, amyl bromide, hexyl bromide, heptyl bromide, octyl bromide, phenyl bromide or benzyl iodide, to produce the corresponding 2-alkylated product wherein the alkoxy and acyloxy groups correspond to those of the starting 2-alkoxy-oxalyl-11β-hydroxy-21-acyloxy-4,17(20)-pregnadiene-3-one and the alkyl group corresponds to that of the alkyl halide, e. g., 2-methyl, ethyl, propyl, butyl, amyl, hexyl, heptyl, octyl, phenyl, benzyl, etc., 2-methoxy, ethoxy, propoxy, butoxy, amyloxy, hexyloxy, heptyloxy, octyloxyoxalyl, etc., and 21-formyloxy, acetoxy, propionyloxy, butyryloxy, valeryloxy, hexanoyloxy, heptanoyloxy or octanoyloxy.

If the starting 2-alkoxyoxalyl steroid to be alkylated is 21-esterified, the reaction product, depending upon the ease of hydrolysis of or alcoholysis of the 21-ester group and the alkylation conditions, produces a reaction product consisting, at least in part, of 2-alkylated steroid having a 21-hydroxy group. Examples of 21-ester groups quite resistant to hydrolysis or alcoholysis are 21-trimethylacetate and 21-triethylacetate. Other 21-esters may, if the alkylation reaction contains methyl or ethyl alcohol, be partially or completely converted to a 21-hydroxy group.

PREPARATION 4

*2-methyl-11β,21-dihydroxy-4,17(20)-pregnadiene-3-one*

The glassy residue of crude 2-methyl-2-methoxyoxalyl-11β-hydroxy-21-acetoxy-4,17(20)-pregnadiene-3-one, obtained according to the method described in Preparation 3, was dissolved in fifty milliliters of methanol to which was then added three milliliters of a 25 percent solution of sodium methoxide in methanol. The now red solution was stirred for two hours at about 25 degrees centigrade. The mixture was then diluted with about 200 milliliters of water and extracted thoroughly with methylene chloride. The combined methylene chloride extracts were washed with water, dried, and the solvent then distilled therefrom, leaving a steroidal residue consisting essentially of 2-methyl-11β,21-dihydroxy-4,17(20)-pregnadiene-3-one. The thus-produced 2-methyl-11β,21-dihydroxy-4,17(20)-pregnadiene-3-one is purified by chromatography over Florisil synthetic magnesium silicate using Skellysolve B hexane hydrocarbons containing increasing amounts of acetone for development.

Similarly, 2-methyl-11β,21-dihydroxy-4,17(20)-pregnadiene-3-one is prepared by substituting, as starting steroid for the reaction described above, another 2-methyl-2-lower-alkoxyoxalyl-11β-hydroxy-21-acetoxy-4,17(20)-pregnadiene-3-one, e. g., wherein the lower alkoxy group is ethoxy, propoxy, butoxy, amyloxy, hexyloxy, heptyloxy or octyloxy, for the 2-methyl-2-methoxy-oxalyl-11β-hydroxy-21-acetoxy-4,17(20)-pregnadiene-3-one employed in Preparation 4.

Following the procedure described in Preparation 4, other 2-lower-alkyl-11β,21-dihydroxy-4,17(20)-pregnadiene-3-ones are prepared wherein the lower-alkyl group is, for example, ethyl, propyl, butyl, amyl, hexyl, heptyl, octyl, phenyl, benzyl, etc., by substituting a 2-lower-alkyl-2-lower-alkoxyoxalyl-11β,21-dihydroxy-4,17(20)-pregnadiene-3-one or 21-acyloxy ester thereof wherein the lower-alkoxy group is, for example, methoxy, ethoxy, propoxy, butoxy, amyloxy, hexyloxy, heptyloxy, etc., and the lower-alkyl group corresponds to the desired lower-alkyl group of the reaction product, for the 2-methyl-2-methoxyoxalyl-11β-hydroxy-21-acetoxy-4,17(20)-pregnadiene-3-one employed as starting steroid in the reaction described in Preparation 4.

PREPARATION 5

2-ethyl-11β,21-dihydroxy-4,17(20)-pregnadiene-3-one

Following the procedure described in Preparation 4, but substituting 2-ethyl-2-methoxyoxalyl-11β-hydroxy-21-acetoxy-4,17(20)-pregnadiene-3-one as the starting steroid, there is thus produced 2-ethyl-11β,21-dihydroxy-4,17(20)-pregnadiene-3-one.

PREPARATION 6

2-methyl-11β-hydroxy-21-acetoxy-4,17(20)-pregnadiene-3-one

The crude residue obtained from Preparation 4, 2-methyl-11β,21-dihydroxy-4,17(20)-pregnadiene-3-one, was dissolved in a mixture of ten milliliters of acetic anhydride and ten milliliters of dry pyridine. The mixture was maintained at about 25 degrees centigrade for about sixteen hours. The excess acetic anhydride was then decomposed with ice water and the resulting gummy precipitate was extracted with benzene. The benzene solution was washed with cold dilute hydrochloric acid, cold aqueous sodium bicarbonate and finally with water and then dried. The dried benzene solution was poured over a chromatographic column of 100 grams of Florisil synthetic magnesium silicate. The column was developed with 1350 milliliters of Skellysolve B hexane hydrocarbons containing five percent acetone followed by 750 milliliters of Skellysolve B plus 7.5 percent acetone and then 150 milliliters of acetone. The eluates were collected in 150 milliliter fractions. Eluate fractions 4 to 8 contained a total of 1.71 grams, a yield of 44 percent, calculated on the starting 2-methoxyoxalyl-11β,21-dihydroxy-4,17(20)-pregnadiene-3-one, of crystalline 2-methyl-11β-hydroxy-21-acetoxy-4,17(20)-pregnadiene-3-one. Recrystallization of this product gave pure 2-methyl-11β-hydroxy-21-acetoxy-4,17(20)-pregnadiene-3-one of melting point 182 to 184.5 degrees centigrade, having a [α]$_D$ of plus 145 degrees in chloroform, an ultraviolet adsorption of 15,025 at 242 millimicrons and the analysis below.

Calculated for $C_{24}H_{34}O_4$: C, 74.57; H, 8.87. Found: C, 74.32; H, 8.79.

Similarly, 2-methyl-11β,21-dihydroxy-4,17(20)-pregnadiene-3-one is converted to other 2-methyl-11β-hydroxy-21-acyloxy-4,17(20)-pregnadiene-3-ones by esterification of the 21-hydroxy group, e. g., by reaction with the appropriate acid anhydride, acid chloride or bromide, ester by ester exchange, acid in the presence of an esterification catalyst, etc., 2-methyl-11β,21-dihydroxy-4,17 (20)-pregnadiene-3-one is similarly converted to other 21-esters thereof. Examples of 2-methyl-11β-hydroxy-21-acyloxy-4,17(20)-pregnadiene-3-one prepared include those wherein the acyl group is the acyl radical of, for example, a lower-aliphatic acid, e. g., formic, propionic, butyric, isobutyric, valeric, isovaleric, trimethylacetic, 3-ethylbutyric, hexanoic, diethylacetic, triethylacetic, heptanoic, octanoic, the optically active abietic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl, or alkaryl acid, e. g., benzoic 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium salts), e. g., succinic, glutaric, α-methylglutaric, β-methylglutaric, β,β-dimethylglutaric, adipic, pimelic, suberic, a hydroxyacid, e. g., glycolic, lactic, citric, tartaric, d-maleic, d-glyceric, mannonic, gluconic, salicylic, an aminoacid, e. g., glycine, diglycollamic, triglycollamic, methylglycine, dimethylglycine, diethylglycine, para-aminosalicylic, para-aminobenzoic, other hetero-substituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, nicotinic acid, 6-hydroxyindolyl-3-acetic, N-methylmorpholyl-2-carboxylic, lysergic, pyrrolyl-2-carboxylic, or other acyl acid.

PREPARATION 7

2-ethyl-11β-hydroxy-21-acetoxy-4,17(20)-pregnadiene-3-one

Following the procedure described in Preparations 1, 3, 4 and 6, but substituting ethyl iodide for the methyl iodide as the alkylating agent, 11β-hydroxy-21-acetoxy-4,17(20)-pregnadiene-3-one was converted to 2-ethyl-11β-hydroxy-21-acetoxy-4,17(20)-pregnadiene-3-one. The reaction product from the acetylation was dissolved in methylene chloride and poured over a column of Florisil synthetic magnesium silicate. The 2-ethyl-11β-hydroxy-21-acetoxy-4,17(20)-pregnadiene-3-one was eluted from the column with Skellysolve B hexane hydrocarbons plus five percent acetone and melted, after crystallization from a mixture of acetone and Skellysolve B, at 149 to 151 degrees centigrade, and had the analysis below.

Calculated for $C_{25}H_{36}O_4$: C, 74.96; H, 9.06. Found: C, 75.23; H, 9.17.

Similarly, other 2-lower-alkyl-11β,21-dihydroxy-4,17(20)-pregnadiene-3-ones are esterified to produce the 2-lower-alkyl-11β-hydroxy-21-acyloxy-4,17(20)-pregnadiene-3-ones wherein the lower-alkyl group is, for example, ethyl, propyl, butyl, amyl, hexyl, heptyl, octyl, phenyl, benzyl, etc., and the acyl group is the acyl radical of an acid named in Preparation 6 or the paragraph following.

PREPARATION 8

2-methyl-11β,17α-dihydroxy-21-acetoxy-4-pregnene-3,20-dione

To a solution of 1.40 grams (3.68 millimoles) of 2-methyl-11β-hydroxy-21-acetoxy-4,17(20)-pregnadiene-3-one in seventy milliliters of dry tertiary butyl alcohol was added at room temperature nine milliliters of dry pyridine, 5.8 milliliters of dry tertiary butyl alcohol solution containing 1.37 grams (9.1 millimoles) of N- methylmorpholineoxide peroxide, and ten milligrams of osmium tetroxide, in that order. The resulting solution was stirred at between 25 and thirty degrees centigrade for eighteen hours. There was then added 150 milliliters of water to the mixture which was then extracted thoroughly with methylene chloride, the methylene chloride solution washed with water, cold dilute hydrochloric acid, cold aqueous sodium bicarbonate, water and then dried. The solvent was distilled from the dried solution at reduced pressure. The crude residue was dissolved in methylene chloride and poured over a column of 110 grams of Florisil synthetic magnesium silicate. The column was developed with 175-milliliter portions of solvent of the following composition and order: eight of Skellysolve B plus ten percent acetone, seven of Skellysolve B plus twelve percent acetone, two of Skellysolve B plus fifteen percent acetone, and one of acetone. The Skellysolve B plus five percent acetone eluted 331 milligrams of starting steroid. The Skellysolve B plus twelve percent acetone eluted 784 milligrams, a yield of 69 percent calculated on the starting steroid which reacted, of 2-methyl-11β,17α-dihydroxy-21-acetoxy-4-pregnene-3,20-dione which, after crystallization from ether, melted at 133 to 135 degrees centigrade, had a $[\alpha]_D$ of plus 158 degrees in chloroform and an analysis as follows:

Calculated for $C_{24}H_{34}O_6$: C, 68.87; H, 8.19. Found: C, 68.38; H, 8.52.

Subsequent crystallization of 2-methyl-11β,17α-dihydroxy-21-acetoxy-4-pregnene-3,20-dione from a mixture of ethyl acetate and Skellysolve B gave crystals of a different crystalline structure melting at 171 to 171.5, having a $[\alpha]_D$ of plus 164 degrees, an $E_{242}$ of 15,125, the same papergram and infrared spectrum analysis as above and a carbon-hydrogen analysis substantially as calculated.

In the same manner other 2-methyl-11β-hydroxy-21-acyloxy-4,17(20)-pregnadiene-3-ones are converted to the corresponding 2-methyl-11β,17α-dihydroxy-21-acyloxy-4-pregnene-3,20-diones wherein the acyl group is the acyl radical of, for example, a lower-aliphatic acid, e. g., formic, propionic, butyric, isobutyric, valeric, isovaleric, trimethylacetic, 3-ethylbutyric, hexanoic, diethylacetic, triethylacetic, heptanoic, octanoic, benzoic, and others as mentioned in Preparation 6.

PREPARATION 9

2-ethyl-11β,17α-dihydroxy-21-acetoxy-4-pregnene-3,20-dione

Following the procedure described in Preparation 8, but substituting 2-ethyl-11β-hydroxy-21-acetoxy-4,17(20)-pregnadiene-3-one as the starting steroid, there is thus produced 2-ethyl-11β,17α-dihydroxy-21-acetoxy-4-pregnene-3,20-dione. The crude reaction product from the oxidative hydroxylation was dissolved in methylene chloride which was poured over a column of Florisil synthetic magnesium silicate. The column was developed in exactly the manner described in Preparation 8 and the 2-ethyl-11β,17α-dihydroxy-21-acetoxy-4-pregnene-3,20-dione, was eluted with Skellysolve B plus ten percent acetone and melted, after crystallization from dilute melthanol, at 166 to 169 degrees centigrade.

Similarly, other 2-lower-alkyl-11β-hydroxy-21-acyloxy-4,17(20)-pregnadiene-3-ones are oxidatively hydroxylated to produce a compound named in Preparation 8 or the paragraph following wherein the 2-methyl group is replaced by a lower-alkyl group for example, ethyl, propyl, isopropyl, butyl, pentyl, hexyl, heptyl, octyl, phenyl, benzyl, etc.

PREPARATION 10

2-methyl-17α-hydroxy-21-acetoxy-4,9(11)-pregnadiene-3,20-dione

A mixture of one gram (2.38 millimoles) of 2-methyl-11β,17α-dihydroxy-21-acetoxy-4-pregnene-3,20-dione, 662 milligrams (two equivalents) of N-bromoacetamide and six milliliters of pyridine was stirred in the dark for thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed wtih water and dried under vacuum. After crystallization from acetone there was obtained 0.82 gram, a yield of 85 percent of the theoretical, of 2-methyl-17α-hydroxy-21-acetoxy-4,9(11)-pregnadiene-3,20-dione as colorless needles melting at 212 to 217 degrees centigrade. A sample recrystallized from a mixture of acetone and methylene chloride melted at 220 to 223 degrees centigrade, had a $[\alpha]_D$ of plus 138 degrees in chloroform, an infrared adsorption spectrum consistent with the structure, and the analysis below:

Calculated for $C_{24}H_{32}O_5$: C, 71.97; H, 8.05. Found: C, 72.05; H, 8.32.

Following the procedure described in Preparation 10, but substituting another 21-ester of a 2-lower-alkyl-11β,17α,21-trihydroxy-4-pregnene-3,20-dione, as shown in Preparations 8 and 9, the 2-methyl-11β,17α-dihydroxy-21-acyloxy-4-pregnene-3,20-diones wherein the acyl radical is that of a hydrocarbon carboxylic acid containing from one to twelve carbon atoms, inclusive, as the starting steroid in the reaction, there are produced other 21-esters of 2-methyl-17α,21-dihydroxy-4,9(11)-pregnadiene-3,20-dione and 2-lower-alkyl homologues thereof.

PREPARATION 11

2-methyl-9α-bromo-11β,17α-dihydroxy-21-acetoxy-4-pregnene-3,20-dione

To a stirred solution of 0.50 gram (1.24 millimole) of 2-methyl-17α-hydroxy-21-acetoxy-4,9(11)-pregnadiene-3,20-dione in twenty milliliters of methylene chloride was added a solution of one milliliter of 71 percent perchloric acid, in ten milliliters of water, and 206 milligrams (1.49 millimole) of N-bromoacetamide in fifty milliliters of tertiary butyl alcohol. The solution was maintained at room temperature for fifteen minutes and then mixed wtih a solution of 0.25 gram of sodium sulfite in twelve mililliters of water. The mixture was distilled at reduced pressure until the residual solution became cloudy. The product was then precipitated therefrom by the addition of 100 milliliters of a mixture of ice and water. The white, crystalline precipitate of 2-methyl-9α-bromo-11β,17α-dihydroxy-21-acetoxy-4-pregnene-3,20-dione was filtered, washed with water and then dried, at room temperature under vacuum. The dry product weighed 0.57 gram, a yield of 92.2 percent of the theoretical, and melted at 125 to 130 degrees centigrade. A sample recrystallized from a mixture of acetone and Skellysolve B hexane hydrocarbons melted at 128 to 131 degrees centigrade and had the analysis below:

Calculated for $C_{24}H_{33}BrO_6$: Br, 16.07. Found: Br, 16.27; 16.06.

Following the procedure described in Preparation 11, but substituting another 21-ester of a 2-lower-alkyl-17α,21-dihydroxy-4,9(11)-pregnadiene-3,20-dione, e. g., a 2-methyl-17α-hydroxy-21-acyloxy-4,9(11)-pregnadiene-3,20-dione wherein the acyl radical is that of a carboxylic acid named in the paragraph following Preparation 6, especially those of hydrocarbon carboxylic acids containing from one to twelve carbon atoms, inclusive, as the starting steroid in the reaction, there are produced other 21-esters of 2-methyl-9α-bromo-11β,17α,21-trihydroxy-4-pregnene-3,20-dione and 2-lower-alkyl homologues thereof.

PREPARATION 12

2-methyl-9:11-β-oxido-17α-hydroxy-21-acetoxy-4-pregnene-3,20-dione

A mixture of 0.47 gram (0.95 millimole) of 2-methyl-9α - bromo - 11β,17α - dihydroxy - 21 - acetoxy - 4 - pregnene-3,20-dione, 0.47 gram of anhydrous potassium acetate and twenty milliliters of acetone was heated at its refluxing temperature for five hours. The cooled mixture was poured into water and then extracted with methylene chloride. The methylene chloride extract was dried and then poured over a column of 25 grams of Florisil synthetic magnesium silicate. The column was developed with Skellysolve B hexane hydrocarbons containing increasing proportions of acetone. The Skellysolve B plus ten percent acetone eluates contained 0.29 gram, a yield of 75 percent of the theoretical, of 2-methyl-9:11-β-oxido - 17α - hydroxy - 21 - acetoxy - 4 - pregnene - 3,20-dione which, when recrystallized from a mixture of acetone and Skellysolve B hexanes, was obtained as colorless plates melting at 185 to 188 degrees centigrade, having a $[\alpha]_D$ of plus 49 degrees in chloroform, and having the analysis below:

Calculated for $C_{24}H_{32}O_6$: C, 69.20; H, 7.75. Found: C, 69.28; H, 7.90.

Following the procedure described in Preparation 11, but substituting another 21-ester of a 2-lower-alkyl-9α-bromo - 11β,17α,21 - trihydroxy - 4 - pregnene - 3,20-dione, e. g., a 2-methyl-9α-bromo-11β,17α-dihydroxy-21-acyloxy-4-pregnene-3,20-dione wherein the acyl radical is that of a carboxylic acid named in the paragraph following Preparation 6, especially those of hydrocarbon carboxylic acid containing from one to twelve carbon atoms, inclusive, as the starting steroid in the reaction, there are produced other 21-esters of 2-methyl-9:11-β-oxido-17α,21 - dihydroxy - 4 - pregnene - 3,20 - dione and 2-lower-alkyl homologues thereof.

PREPARATION 13

2-methyl-9α-fluoro-11β,17α-dihydroxy-21-acetoxy-4-pregnene-3,20-dione

A solution of 1.07 grams (2.57 millimoles) of 2-methyl-9:11 - β - oxido - 17α - hydroxy - 21 acetoxy - 4 - pregnene-3,20-dione in 150 milliliters of methylene chloride was concentrated to a volume of fifty milliliters by distillation. To the concentrated solution at room temperature was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with 200-milliliter portions of Skellysolve B plus ten percent acetone. The eighth through sixteenth eluate fractions contained 0.61 gram of 2-methyl-9α-fluoro-11β,17α-dihydroxy-21-acetoxy-4-pregnene-3,20-dione which after crystallization from a mixture of acetone and Skellysolve B hexanes melted at 218 to 222 degrees centigrade with decomposition. A portion recrystallized from the same solvent melted at 225 to 228 degrees centigrade with decomposition, had a $[\alpha]_D$ of plus 156 degrees in dioxane, a $\lambda_{max.}^{alcohol}$ of 239

$\epsilon=15,850$, and the analysis below:

Calculated for $C_{24}H_{35}FO_6$: C, 66.03; H, 7.62; F, 4.35. Found: C, 65.62; H, 7.54; F, 3.87.

Following the procedure described in Preparation 13, but substituting another 21-ester of a 21-lower-alkyl-9:11-β - oxido - 17α,21 - dihydroxy - 4 - pregnene - 3,20-dione, e. g., a 2-methyl-9:11-β-oxido-17α-hydroxy-21-acyloxy-4-pregnene-3,20-dione wherein the acyl radical is that of an organic carboxylic acid named in the paragraph following Preparation 6, especially those of a hydrocarbon carboxylic acid containing from one to twelve carbon atoms, inclusive, as the starting steroid in the reaction, there are produced other 21-esters of 2-methyl-9α - fluoro - 11β,17α,21 - trihydroxy - 4 - pregnene - 3,20-dione and 2-lower-alkyl homologues thereof.

Following the procedure described in Preparation 13, but substituting a molar equivalent amount of hydrogen chloride for the hydrogen fluoride used therein, produces 2 - methyl - 9α - chloro - 11β,17α - dihydroxy - 21 - acetoxy - 4 - pregnene - 3,20 - dione. Substituting another 2 - methyl - 9:11 - β - oxido - 17α - hydroxy - 21 - acyloxy-4-pregnene-3,20-dione, e. g., one named above, in the reaction with hydrogen chloride is productive of other 2 - methyl - 9α - chloro - 11β,17α - dihydroxy - 21 - acyloxy-4-pregnene-3,20-diones.

PREPARATION 14

2-methyl-9α-fluoro-11β,17α,21-trihydroxy-4-pregnene-3,20-dione

A solution of 437 milligrams of 2-methyl-9α-fluoro-11β,17α - dihydroxy - 21 acetoxy - 4 - pregnene - 3,20-dione is freed of oxygen by bubbling nitrogen therethrough. A solution of 404 milligrams of potassium bicarbonate in four milliliters of water is similarly freed of oxygen. The two solutions are mixed at a temperature between eighteen and twenty degrees centigrade in a nitrogen atmosphere. The mixture is stirred at room temperature for five hours while protecting it from atmospheric oxygen with nitrogen. At the end of this time the solution is neutralized with glacial acetic acid. The neutral solution is concentrated by distillation at room temperature and reduced pressure and then chilled in a refrigerator for sixteen hours. The precipitated 2-methyl - 9α - fluoro - 11β,17α,21 - trihydroxy - 4 - pregnene-3,20-dione is filtered and dried.

2 - methyl - 9α - fluoro - 11β,17α,21 - trihydroxy - 4-pregnene-3,20-dione is converted to other 2-methyl-9α-fluoro - 11β,17α - dihydroxy - 21 - acyloxy - 4 - pregnene-3,20-diones by esterification of the 21-hydroxy group, e. g., by reaction with the appropriate acid anhydride, acid chloride or bromide, ester by ester exchange, acid in the presence of an esterification catalyst, etc. Examples of 2 - methyl - 9α - fluoro - 11β,17α - dihydroxy - 21 - acyloxy-4-pregnene-3,20-dione prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β - cyclopentylpropionic, cyclohexylformic, cyclohexylacetic, β-cyclohexylpropionic, an aryl or alkaryl acid, e. g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts), e. g., succinic, glutaric, α-methylglutaric, β-methylglutaric, β,β-dimethylglutaric, adipic, pimelic, suberic, a hydroxyacid, e. g., glycolic, lactic, citric, tartaric, d-maleic, d-glyceric, mannonic, gluconic, salicyclic, an amino-acid, e. g., glycine, diglycolamic, triglycolamic, methylglycine, dimethylglycine, diethylglycine, para-aminosalicyclic, para-aminobenzoic, other heterosubstituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α - naphthoxyacetic, β - pyrrolidylpropionic, carbamic acids, e. g., carbamic acid, phenylcarbamic, n - butylcarbamic, dimethylcarbamic, diethylcarbamic, allophanic, or a heterocyclic acid, e. g., nicotinic, β-furyl-carboxylic, N-methylpyrrolidyl-2-carboxylic, α-picolinic, N-methylindole-2-carboxylic, 6-hydroxyindolyl-3-acetic, N-methylmorpholyl-2-carboxylic, lysergic, pyrrolyl-2-carboxylic, or other acyl acid.

PREPARATION 15

*2 - methyl - 9α - fluoro - 17α - hydroxy - 21 - acetoxy - 4-pregnene - 3,11,20 - trione*

To a stirred solution of 174 milligrams (0.004 mole) of 2 - methyl - 9α - fluoro - 11β,17α - dihydroxy - 21-acetoxy-4-pregnene-3,20-dione, dissolved in 11.9 milliliters of glacial acetic acid and thereafter cooled to fourteen degrees centigrade, is added dropwise, over a period of twenty minutes, a solution of 0.55 gram of chromium trioxide, dissolved in 1.1 milliliter of glacial acetic acid and 1.1 milliliter of water. The temperature of the stirred solution is thereafter allowed to rise to eighteen degrees centigrade over a period of one hour. The excess chromium trioxide is destroyed by the addition of an aqueous sodium sulfite solution, and the product then extracted from the reaction mixture with three fifteen-milliliter portions of ether which are thereafter combined, washed with water, and dried over anhydrous sodium sulfate. The ether is then removed by evaporation. The residue consists essentially of 2-methyl-9α-fluoro-17α-hydroxy-21-acetoxy-4-pregnene-3,11,20-trione, which is purified by chromatographing over a column of ten grams of Florisil synthetic magnesium silicate. Developing the column with Skellysolve B hexane hydrocarbons containing increasing proportions of acetone elutes essentially pure 2 - methyl - 9α - fluoro - 17α - hydroxy - 21-acetoxy-4-pregnene-3,11,20-trione from the column.

Similarly, other 21-organic carboxylic acid esters of 2-lower - alkyl - 17α - hydroxy - 21 - acyloxy - 4 - pregnene-3,11,20 - trione and 2 - lower-alkyl - 9α - halo - 17α-hydroxy - 21 - acyloxy - 4 - pregnene - 3,11,20 - trione, preferably wherein the lower-alkyl group is methyl, are prepared by oxidation of the corresponding 21-ester of 2 - lower - alkyl - 17α,21 - dihydroxy - 4 - pregnene-3,20-dione, and 2-lower-alkyl-9α-halo-17α,21-dihydroxy-4-pregnene-3,20-dione, preferably the esters named in the paragraph following Preparation 6, especially those wherein the acyl radical is that of a hydrocarbon carboxylic acid containing from one to twelve carbon atoms, inclusive.

PREPARATION 16

*2 - methyl - 11β,17α,21 - trihydroxy - 4 - pregnene - 3,20-dione*

A solution of three grams of 2-methyl-11β,17α,21-trihydroxy-4-pregnene-3,20-dione 21-acetate, dissolved in 150 milliliters of methanol, was freed from oxygen by bubbling nitrogen gas through the solution for a period of five minutes. A solution of 1.4 grams (0.014 mole) of potassium bicarbonate was similarly purged of oxygen and mixed thereupon with a steroid solution. The resulting mixture was stirred in a nitrogen atmosphere for a period of five hours. Thereafter a solution of two milliliters of acetic acid and fifty milliliters of water was added and the mixture concentrated at reduced pressure to approximately 75 milliliters of volume. After refrigerating overnight the crystals were collected, washed with water, and dried under vacuum to give 2.25 grams (85.6 percent yield) of 2-methyl-11β,17α,21-trihydroxy-4-pregnene-3,20-dione of melting point 233 to 239 degrees. This material was recrystallized from acetone to give pure 2 - methyl - 11β,17α,21 - trihydroxy - 4 - pregnene - 3,20-dione of melting point 237 to 238 degrees, $$\lambda_{max.}^{alc.}\ 242\ m\mu$$

$\epsilon$=15,250; $[\alpha]_D$ plus 185 degrees (95 percent ethanol).
*Analysis.*—Calcd. for $C_{22}H_{32}O_5$: C, 70.18; H, 8.57. Found: C, 70.14; H, 8.61.

In the same manner as shown in Preparation 16, 2-ethyl - 11β,17α,21 - trihydroxy - 4 - pregnene - 3,20-dione 21-acetate, was hydrolyzed with potassium bicarbonate in ethanol solution under exclusion of oxygen as described in the beforementioned example to give 2-ethyl-11β,17α,21-trihydroxy-4-pregnene-3,20-dione.

PREPARATION 17

*2 - methyl - 9α - fluoro - 17α,21 - dihydroxy - 4 pregnene-3,11,20 - trione*

In the same manner as shown in Preparation 16, 2-methyl - 9α - fluoro - 17α - hydroxy - 21 - acetoxy - 4-pregnene-3,11,20-trione was hydrolyzed with potassium bicarbonate in aqueous methanol solution in a nitrogen atmosphere to give 2-methyl-9α-fluoro-17α,21-dihydroxy-4-pregnene-3,11,20-trione.

PREPARATION 18

*2 - methyl - 9α - bromo - 11β,17α,21 - trihydroxy - 4-pregnene - 3,20 - dione*

A solution of one gram of 2-methyl-9α-bromo-11β,17α,21-trihydroxy - 4 - pregnene - 3,20 - dione 21-acetate in 100 milliliters of dioxane was treated with one milliliter of sulfuric acid, dissolved in five milliliters of water. The reaction mixture was maintained 48 hours at room temperature, about 25 degrees centigrade, and thereupon poured onto 100 grams of ice. The resulting aqueous solution was filtered and the precipitate was recrystallized from acetone-Skellysolve B hexanes to give pure 2-methyl - 9α - bromo - 11β,17α,21 - trihydroxy - 4-pregnene-3,20-dione.

In the same manner as shown in Preparation 18, hydrolysis of 2-methyl-9α-chloro-11β,17α,21-trihydroxy-4-pregnene-3,20-dione 21-acetate or other 21-acylates such as named following Preparation 6 in an acidic medium provides 2 - methyl - 9α - chloro - 11β,17α,21 - trihydroxy-4-pregnene-3,20-dione. For the acidic medium instead of dioxane and sulfuric acid, methanol, ethanol, acetone, tertiary butyl alcohol and other organic solvents may be used together with sulfuric, hydrochloric, perchloric, chloric, or para-toluene-sulfonic acid can be used.

Similarly, other 2-methyl-11β,17α-dihydroxy-21-acyloxy-4-pregnene-3,20-diones wherein the acyl group is the acyl radical of, for example, a lower-aliphatic acid such as formic, propionic, butyric, isobutyric, valeric, isovaleric, trimethylacetic, 2-methylbutyric, 3-ethylbutyric, hexanoic, diethylacetic, triethylacetic, heptanoic, octanoic, benzoic, 2, 3, or 4-methyl-benzoic, β-cyclopentyl-propionic, phenylacetic, phenylpropionic, a dibasic acid (which can be converted to water soluble, for example, sodium salts), for example, succinic, glutaric, adipic, suberic, tartaric, citric, halogenated acids, such as chloroacetic, dichloroacetic, fluoroacetic, trichloroacetic, trifluoroacetic, or the like, are converted to the corresponding 2 - methyl - 11β,17α,21 - trihydroxy - 4-pregnene-3,20-diones.

In the same manner as shown in Preparations 16 thru 18, other 2 - lower-alkyl-11β,17α-dihydroxy-21-acyloxy-4-pregnene-3,20-diones wherein the lower-alkyl group may be methyl, ethyl, propyl, isopropyl, butyl, pentyl, hexyl, heptyl, octyl, phenyl, or benzyl, or the like, and wherein the acyloxy group is any of the above mentioned acyloxy groups, can be converted to the corresponding 2-lower-alkyl-11β,17α,21-trihydroxy-4-pregnene-3,20-diones.

EXAMPLE 1

*21-toluenesulfonate of 2-methyl-11β,17α,21-trihydroxy-4-pregnene-3,20-dione*

A solution of 3.4 grams (0.00905 mole) of 2-methyl-11β,17α,21-trihydroxy-4 - pregnene - 3,20 - dione in thirty milliliters of pyridine was cooled to zero degrees and treated dropwise with stirring with a solution of 2.0 grams (0.0105 mole) of toluenesulfonyl chloride, dissolved in 25 milliliters of methylene chloride. The addition required ten minutes after which the solution was refrigerated to plus five degrees centigrade for a period of 18 hours. The solution was thereupon poured into water and extracted with a large quantity of methylene chloride. The combined extracts were washed with cold five percent hydrochloric acid solution to remove pyridine, then with cold five percent sodium bicarbonate solution, and thereafter with water. After drying the solution over anhydrous sodium sulfate the extract was evaporated at reduced pressure, to give a residue of 21-toluenesulfonate of 2-methyl-11$\beta$,17$\alpha$,21-trihydroxy-4-pregnene-3,20-dione.

EXAMPLE 2

*2-ethyl-11$\beta$,17$\alpha$,21-trihydroxy-4-pregnene-3,20-dione-21-methanesulfonate*

In the same manner as shown in Example 1, substituting the 2 - methyl-11$\beta$,17$\alpha$,21-trihydroxy-4-pregnene-3,20-dione by 2-ethyl-11$\beta$,17$\alpha$,21-trihydroxy-4-pregnene-3,20-dione and the toluenesulfonyl chloride by methanesulfonyl chloride produces a 21-methanesulfonate of 2-ethyl-11$\beta$,17$\alpha$,21-trihydroxy-4-pregnene-3,20-dione.

EXAMPLE 3

*21-toluenesulfonate of 2-methyl-9$\alpha$-fluoro-11$\beta$,17$\alpha$,21-trihydroxy-4-pregnene-3,20-dione*

In the same manner as shown in Example 1, treating 2-methyl-9$\alpha$-fluoro-11$\beta$,17$\alpha$,21 - trihydroxy - 4 - pregnene-3,20-dione with toluenesulfonyl chloride in pyridine solution produces the toluenesulfonate of 2-methyl-9$\alpha$-fluoro-11$\beta$,17$\alpha$,21-trihydroxy-4-pregnene-3,20-dione.

Similarly to Example 3, the corresponding 9$\alpha$-chloro, 9$\alpha$-bromo, 9$\alpha$-iodo derivatives of 2-methyl-11$\beta$,17$\alpha$,21-trihydroxy-4-pregnene-3,20-dione 21-organic acid sulfonates such as 21-toluenesulfonate can be produced by reacting the desired 2 - methyl - 9$\alpha$ - halo-11$\beta$,17$\alpha$,21-trihydroxy-4-pregnene-3,20-diones with the desired 21-organic acid sulfonyl chloride.

EXAMPLE 4

*21-toluenesulfonate of 2-methyl-9$\alpha$-fluoro-17$\alpha$,21-dihydroxy-4-pregnene-3,11,20-trione*

In the same manner as shown in Example 1, treating 2-methyl-9$\alpha$-fluoro-17$\alpha$,21-dihydroxy-4 - pregnene - 3,11,20-trione with toluenesulfonyl chloride yields the 21-toluenesulfonate of 2 - methyl - 9$\alpha$ - fluoro - 17$\alpha$,21-dihydroxy-4-pregnene-3,11,20-trione.

In the same manner as Examples 2, 3, and 4, other 2-lower-alkyl - 11$\beta$,17$\alpha$,21 - trihydroxy - 4 - pregnene - 3,20-dione 21-toluenesulfonates, benzenesulfonates, methanesulfonates, $\beta$-naphthylsulfonates, and the like, may be produced wherein the lower-alkyl groups are methyl, ethyl, propyl, isopropyl, butyl, isobutyl, pentyl, hexyl, benzyl, or phenyl, and wherein the 9$\alpha$-position may be substituted by a halo atom having an atomic weight between 17 and 131.

EXAMPLE 5

*2-methyl-11$\beta$,17$\alpha$-dihydroxy-4-pregnene-3,20-dione*

The crude 21-toluenesulfonate of 2-methyl-11$\beta$,17$\alpha$,21-trihydroxy-4-pregnene-3,20-dione, as obtained in Example 1, was dissolved in 100 milliliters of warm acetone and treated with a solution of four grams of sodium iodide, dissolved in fifty milliliters of acetone. The mixture was stirred under reflux for fifteen minutes and then evaporated at reduced pressure to give crude 2-methyl-11$\beta$,17$\alpha$-dihydroxy-21-iodo-4-pregnene-3,20-dione.

The crude 2 - methyl - 11$\beta$,17$\alpha$ - dihydroxy - 21-iodo-4-pregnene-3,20-dione was slurried with fifty milliliters of acetic acid, and stirred for 45 minutes. Thereupon was added three grams of zinc dust and the mixture was stirred for another fifteen minutes at room temperature (about 22 degrees centigrade). The reaction mixture was thereupon filtered to remove the excess of zinc and the zinc particles on the filter were washed with ten milliliters of acetic acid and thereupon with methylene chloride. The combined filtrate and washings were diluted with water and extracted with a large quantity of methylene chloride. The thus-obtained methylene chloride extracts were washed with cold five percent sodium bicarbonate solution until neutral, then with water and finally dried over anhydrous sodium sulfate. After evaporation of the solvent at reduced pressure, a crystalline residue was obtained which was recrystallized from acetone repeatedly to give pure 2 - methyl - 11$\beta$,17$\alpha$ - dihydroxy-4-pregnene-3,20-dione of melting point 260 to 264.

*Analysis.*—Calcd. for $C_{22}H_{32}O_4$: C, 73.30; H, 8.95. Found: C, 72.98; H, 9.02.

EXAMPLE 6

*2-methyl-9$\alpha$-fluoro-11$\beta$,17$\alpha$-dihydroxy-4-pregnene-3,20-dione*

In the same manner as given in Example 5, 2-methyl-9$\alpha$-fluoro-11$\beta$,17$\alpha$,21-trihydroxy - 4 - pregnene-3,20-dione 21-toluene-sulfonate, dissolved in acetone, was treated with sodium iodide to give the corresponding 2-methyl-9$\alpha$-fluoro-11$\beta$,17$\alpha$-dihydroxy-21-iodo - 4 - pregnene-3,20-dione which was reduced with zinc and acetic acid to give 2-methyl-9$\alpha$-fluoro-11$\beta$,17$\alpha$-dihydroxy - 4 - pregnene-3,20-dione of melting point 252 to 254 degrees centigrade and rotation [$\alpha$]$_D$ plus 117 degrees in pyridine.

EXAMPLE 7

*2-ethyl-11$\beta$,17$\alpha$-dihydroxy-4-pregnene-3,20-dione*

In the same manner as given in Example 5, 2-ethyl-11$\beta$,17$\alpha$,21-trihydroxy-4-pregnene-3,20-dione 21-methanesulfonate was dissolved in acetone and treated with potassium iodide to give the corresponding 2-ethyl-11$\beta$,17$\alpha$-dihydroxy-21-iodo-4-pregnene-3,20-dione. The 2-ethyl-11$\beta$,17$\alpha$-dihydroxy-21-iodo - 4 - pregnene-3,20-dione was dissolved in dioxane containing five percent of water and thereupon was added a large excess of sodium hydrosulfite. The mixture was kept at forty degrees centigrade for a period of one hour and thereupon filtered, and the water and dioxane evaporated at reduced pressure. The remaining residue was recrystallized from acetone and Skellysolve B to give pure 2-ethyl-11$\beta$,17$\alpha$-dihydroxy-4-pregnene-3,20-dione.

In the same manner as shown in Examples 1 through 7, inclusive, other 21-organic acid sulfonates, such as especially 21-toluenesulfonates, methanesulfonates, benzenesulfonates, $\alpha$- and $\beta$-naphthylsulfonates, and benzene- and toluenesulfonates substituted by nitro, halo, methyl, methoxy, or ethoxy groups of 2-lower-alkyl-11$\beta$,17$\alpha$,21-trihydroxy-4-pregnene-3,20-diones wherein the lower-alkyl groups are methyl, ethyl, propyl, isopropyl, butyl, isobutyl, pentyl hexyl, heptyl, octyl, benzyl, or phenyl groups, and which in addition may be substituted in position 9$\alpha$- by chloro, bromo, fluoro, or iodo, may be converted with alkali metal iodides in acetone to the corresponding 21-iodo compounds which thereupon are reduced by zinc and acetic acid, sodium hydrosulfite, sodium thiosulfite, sodium sulfite, or the like, to the corresponding 2-lower-alkyl-11$\beta$,17$\alpha$-dihydroxy - 4 - pregnene-3,20-dione.

EXAMPLE 8

*2-methyl-9$\alpha$-fluoro-4-pregnene-3,11,20-trione*

The 21-toluenesulfonate of 2-methyl-9$\alpha$-fluoro-17$\alpha$,21-dihydroxy-4-pregnene-3,11,20-trione of Example 4, was dissolved in acetone and treated with a solution of sodium iodide and acetone as shown in Example 5 to give the corresponding 2-methyl-9$\alpha$-fluoro - 17$\alpha$ - hydroxy-21-iodo - 4 - pregnene - 3,11,20 - trione. Reduction of the 2-methyl-9$\alpha$-fluoro-17$\alpha$-hydroxy - 21 - iodo - 4 - pregnene-3,11,20-trione with zinc and acetic acid was productive of the corresponding 2-methyl-9$\alpha$-fluoro-17$\alpha$-hydroxy-4-pregnene-3,11,20-trione.

In a manner similar to Example 8, other 2-lower-alkyl-9$\alpha$-halo-17$\alpha$-hydroxy-4-pregnene-3,11,20-triones are prepared by converting the corresponding lower-alkyl-9α-halo-17α-hydroxy-21-toluenesulfonyloxy - 4 - pregnene-3,11,20-triones to the corresponding 21-iodo compounds and reducing these iodo compounds with a reducing agent such as zinc and acetic acid, sodium or potassium sulfite, sodium or potassium hydrosulfite, sodium or potassium thiosulfate, or the like.

EXAMPLE 9

*2-methyl-17α-hydroxy-4-pregnene-3,11,20-trione*

A solution of 200 milligrams of 2-methyl-11β,17α-dihydroxy-4-pregnene-3,20-dione was dissolved in fifty milliliters of acetic acid and two milliliters of water and thereto was added 75 milligrams of chromic anhydride. The mixture was shaken and allowed to stand at room temperature (twenty to 25 degrees centigrade) for a period of sixteen hours. Thereafter the reaction mixture was poured onto 100 milliliters of ice, neutralized with sodium bicarbonate and filtered to give a precipitate of 2-methyl-17α-hydroxy - 4 - pregnene-3,11,20-trione. The crude material was recrystallized from acetone Skellysolve B hexanes to give pure 2-methyl-17α-hydroxy-4-pregnene-3,11,20-trione.

EXAMPLE 10

*2-ethyl-17α-hydroxy-4-pregnene-3,11,20-trione*

In the same manner as given in Example 9, 2-ethyl-11β,17α-dihydroxy-4-pregnene-3,11,20-trione is oxidized with chromic acid in acetic acid solution to give the corresponding 2-ethyl-17α-hydroxy - 4 - pregnene - 3,11,20-trione.

EXAMPLE 11

*2-methyl-9α-chloro-17α-hydroxy-4-pregnene-3,11,20-trione*

In the same manner as given in Example 9, 2-methyl-9α - chloro-11β,17α-dihydroxy-4-pregnene-3,20-dione was oxidized with chromic anhydride in acetic acid solution to give 2-methyl-9α-chloro-17α-hydroxy - 4 - pregnene-3,11,20-trione.

EXAMPLE 12

*2-methyl-9α-fluoro-17α-hydroxy-4-pregnene-3,11,20-trione*

A solution of 2-methyl-9α-fluoro-11β,17α-dihydroxy-4-pregnene-3,11,20-trione in benzene was vigorously stirred with a solution of potassium dichromate in water containing for each part of steroid in the benzene layer one half to one part of potassium dichromate together with one and one-half parts of sulfuric acid. The stirring of the mixture was continued for a period of six hours at room temperature, about 25 degrees centigrade, whereupon the benzene layer was separated from the water layer, washed with sodium bicarbonate and water, and dried over anhydrous sodium sulfate. Thereafter the dry benzene layer was evaporated and the residue recrystallized from acetone Skellysolve B hexanes to give pure 2-methyl-9α-fluoro-17α-hydroxy - 4 - pregnene - 3,11,20-trione.

In the same manner as shown in Examples 9 through 12, inclusive, other 2-lower-alkyl-11β,17α-dihydroxy-4-pregnene-3,20-diones which may further be substituted in the 9α-position by fluoro, chloro, bromo, or iodo atoms are oxidized in chromic acid to give the corresponding 2 - lower-alkyl-17α-hydroxy - 4 - pregnene-3,11,20-trione wherein the lower-alkyl group is selected from methyl, ethyl, propyl, isopropyl, butyl, isobutyl, pentyl, hexyl, benzyl, and phenyl.

EXAMPLE 13

*2-methyl-11β,17α-diacetoxy-4-pregnene-3,20-dione*

One half gram of 2-methyl-11β,17α-dihydroxy-4-pregnene-3,20-dione was dissolved in twenty milliliters of acetic anhydride. Thereto was added 0.2 gram of para-toluenesulfonic acid monohydrate and the mixture was heated to reflux for a period of five hours. Thereafter the mixture was poured into 200 milliliters of ice water and the mixture was extracted with three fifty-milliliter portions of methylene chloride. The methylene chloride extracts were washed with water, dried over anhydrous sodium sulfate and evaporated in vacuo. The solid residue was recrystallized from methanol to give pure 2-methyl-11β,17α-diacetoxy-4-pregnene-3,20-dione.

In a manner similar to Example 13, esterifying the 2-lower-alkyl-11-oxygenated-17α-hydroxy - 4 - pregnene-3,20-diones obtained in the prior examples by refluxing these compounds with hydrocarbon carboxylic acid anhydrides or isopropenyl acylate in the presence of a strong acid catalyst produces other 17α-mono- and 11β,17α-di-esters of such 2-alkyl-11-oxygenated-17α-hydroxy-4-pregnene-3,20-diones. Such mono and di-esters illustratively comprise: 2-methyl-11β,17α-dipropionyloxy-4-pregnene-3,20-dione, 2-methyl - 11β,17α - dibutyryloxy-4-pregnene-3,20-dione, 2-methyl - 9α - fluoro - 11β,17α - divaleryloxy - 4 - pregnene-3,20-dione, 2-methyl-9α-fluoro-11β,17α - dibenzoyloxy-4-pregnene-3,20-dione, 2-methyl-17α-acetoxy - 4 -pregnene-3,11,20-trione, 2-methyl-17α-propionyloxy - 4 - pregnene-3,11,20-trione, 2-methyl-17α-butyryloxy-4-pregnene-3,11,20-trione, 2-methyl-9α-fluoro-17α - acetoxy - 4 - pregnene-3,11,20-trione, 2-methyl-9α-fluoro-17α-valeryloxy-4-pregnene-3,11,20-trione, 2-methyl-9α-fluoro-17α-capryloxy - 4 - pregnene - 3,11,20 - trione, 2-methyl-9α-fluoro-17α-benzoyloxy - 4 - pregnene-3,11,20-trione, 2 - ethyl-11β,17α-diacetoxy-4-pregnene-3,20-dione, or 2 - ethyl-11β,17α-dihexanoyloxy-4-pregnene-3,20-dione, or the like. These esters have activity like the free alcohols and often more enhanced than the free alcohols from which they have been derived and can also be substituted for the free alcohols in the before-mentioned compositions.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2-methyl-11β,17α-dihydroxy-4-pregnene-3,20-dione.
2. 2 - methyl - 9α - fluoro - 11β,17α - dihydroxy - 4-pregnene-3,20-dione.
3. 2-methyl-17α-hydroxy-4-pregnene-3,11,20-trione.
4. 2 - methyl - 9α - fluoro - 17α - hydroxy - 4 - pregnene-3,11,20-trione.
5. 2-ethyl-11β,17α-dihydroxy-4-pregnene-3,20-dione.
6. A process for the production of a 2-lower-alkyl-11-oxygenated - 17α - hydroxy - 4 - pregnene - 3,20 - dione which comprises: treating a 2-lower-alkyl-11-oxygenated-17α,21-dihydroxy-4-pregnene-3,20-dione selected from the group consisting of 2-lower-alkyl-11β,17α,21-trihydroxy - 4 - pregnene - 3,20 - dione, 2 - lower - alkyl-17α,21 - dihydroxy - 4 - pregnene - 3,11,20 - trione, 2-lower - alkyl - 9α - halo - 11β,17α,21 - trihydroxy - 4-pregnene - 3,20 - dione, 2 - lower - alkyl-9α-halo-17α,21-dihydroxy-4-pregnene-3,11,20-trione wherein the halo atom has an atomic weight between 17 and 131 and the lower-alkyl radical contains from one to eight carbon atoms, inclusive, with an organic acid sulfonyl chloride selected from the group consisting of toluenesulfonyl chloride, benzenesulfonyl chloride, methanesulfonyl chloride, naphthylsulfonyl chloride to give the corresponding 11-oxygenated-2-lower-alkyl-17α-hydroxy-21-organic acid sulfonyloxy-4-pregnene-3,20-dione; heating the thus obtained 11-oxygenated 2-lower-alkyl-17α-hydroxy-21-organic acid sulfonyloxy-4-pregnene-3,20-dione in acetone solution with alkali iodide to obtain the corresponding 11-oxygenated 2-lower-alkyl-17α-hydroxy-21-iodo-4-pregnene-3,20-dione and treating the thus obtained 21-iodo steroid with a reducing agent selected from the group consisting of zinc dust and acetic acid, an alkali metal thiosulfate, an alkali metal sulfite and an alkali metal hydrosulfite to give the corresponding 11-oxygenated 2-lower-alkyl-17α-hydroxy-4-pregnene-3,20-dione.

7. A process for the production of 2-methyl-11β,17α-dihydroxy - 4 - pregnene - 3,20 - dione which comprises: treating 2 - methyl - 11β,17α,21 - trihydroxy - 4 - pregnene-3,20-dione with toluenesulfonyl chloride to obtain the corresponding 2-methyl-11β,17α-dihydroxy-21-toluenesulfonyloxy-4-pregnene-3,20-dione, reacting the thus obtained 2-methyl-11β,17α-dihydroxy-21-toluenesulfonyloxy-4-pregnene-3,20-dione with an alkali metal iodide in acetone to give 2-methyl-11β,17α-dihydroxy-21-iodo-4-pregnene-3,20-dione and reducing the thus obtained steroid 21-iodide with zinc and acetic acid to give 2-methyl-11β,17α-dihydroxy-4-pregnene-3,20-dione.

8. A process for the production of 2-methyl-9α-fluoro-11β,17α - dihydroxy - 4 - pregnene - 3,20 - dione which comprises: treating 2-methyl-9α-fluoro-11β,17α,21-trihydroxy-4-pregnene-3,20-dione with toluenesulfonyl chloride to obtain the corresponding 2-methyl-9α-fluoro-11β,17α - dihydroxy - 21 - toluenesulfonyloxy - 4 - pregnene-3,20-dione, reacting the thus obtained 2-methyl-9α-fluoro - 11β,17α - dihydroxy - 21 - toluenesulfonyloxy - 4-pregnene-3,20-dione with an alkali metal iodide in acetone to give 2-methyl-9α-fluoro-11β,17α-dihydroxy-21-iodo-4-pregnene-3,20-dione and reducing the thus obtained steroid 21-iodide with zinc and acetic acid to give 2-methyl-9α-fluoro-11β,17α-dihydroxy-4-pregnene-3,20-dione.

9. A process for the production of 2-methyl-17α-hydroxy-4-pregnene-3,11,20-trione which comprises: treating 2 - methyl - 11β,17α,21 - trihydroxy - 4 - pregnene-3,20-dione with toluenesulfonyl chloride to obtain the corresponding 2-methyl-11β,17α-dihydroxy-21-toluenesulfonyloxy-4-pregnene-3,20-dione, reacting the thus obtained 2 - methyl - 11β,17α - dihydroxy - 21 - toluenesulfonyloxy-4-pregnene-3,20-dione with an alkali metal iodide in acetone to give 2-methyl-11β,17α-dihydroxy-21-iodo-4-pregnene-3,20-dione, reducing the thus obtained steroid 21-iodide with zinc and acetic acid to give 2-methyl-11β,17α-dihydroxy-4-pregnene-3,20-dione and oxidizing the thus obtained 2-methyl-11β,17α-dihydroxy-4-pregnene-3,20-dione with chromic acid to obtain 2-methyl-17α-hydroxy-4-pregnene-3,11,20-trione.

10. A process for the production of 2-methyl-9α-fluoro-11α-hydroxy-4-pregnene-3,11,20-trione which comprises: treating 2-methyl-9α-fluoro-11β,17α,21-trihydroxy-4-pregnene-3,20-dione with toluenesulfonyl chloride to obtain the corresponding 2-methyl-9α-fluoro-11β,17α-dihydroxy-21-toluenesulfonyloxy-4-pregnene-3,20-dione, reacting the thus obtained 2-methyl-9α-fluoro-11β,17α-dihydroxy - 21 - toluenesulfonyloxy-4-pregnene-3,20-dione with an alkali metal iodide in acetone to give 2-methyl-9α - fluoro - 11β,17α - dihydroxy - 21 - iodo-4-pregnene-3,20-dione, reducing the thus obtained steroid 21-iodide with zinc and acetic acid to give 2-methyl-9α-fluoro-11β,17α-dihydroxy-4-pregnene-3,20-dione, and oxidizing the thus obtained 2-methyl-9α-fluoro-11β,17α-dihydroxy-4-pregnene-3,20-dione with chromic acid to obtain 2-methyl - 9α-fluoro-17α-hydroxy-4-pregnene-3,11,20-trione.

11. A process for the production of 2-ethyl-11β,17α-dihydroxy-4-pregnene-3,20-dione which comprises: treating 2 - ethyl-11β,17α,21-trihydroxy-4-pregnene-3,20-dione with toluenesulfonyl chloride to obtain the corresponding 2 - ethyl-11β,17α-dihydroxy-21-toluenesulfonyloxy-4-pregnene-3,20-dione, reacting the thus obtained 2-ethyl-11β,17α - dihydroxy - 21 - toluenesulfonyloxy-4-pregnene-3,20-dione with an alkali metal iodide in acetone to give 2 - ethyl - 11β,17α - dihydroxy-21-iodo-4-pregnene-3,20-dione and reducing the thus obtained steroid 21-iodide with zinc and acetic acid to give 2-ethyl-11β,17α-dihydroxy-4-pregnene-3,20-dione.

12. 2 - lower-alkyl - 11β,17α - dihydroxy-4-pregnene-3,20-dione, wherein the lower-alkyl radical contains from one to eight carbon atoms, inclusive.

13. 2 - lower - alkyl-17α-hydroxy-4-pregnene-3,11,20-trione, wherein the lower-alkyl radical contains from one to eight carbon atoms, inclusive.

14. 2 - lower - alkyl-9α-fluoro-11β,17α-dihydroxy-4-pregnene-3,20-dione wherein the lower-alkyl radical contains from one to eight carbon atoms, inclusive.

15. 2 - lower - alkyl-9α-fluoro-17α-hydroxy-4-pregnene-3,11,20-trione wherein the lower-alkyl radical contains from one to eight carbon atoms, inclusive.

16. A compound represented by the formula

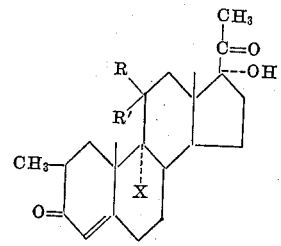

wherein R is hydrogen, R' is β-hydroxy and together R and R' is oxygen and X is selected from the group consisting of hydrogen and fluorine.

References Cited in the file of this patent
UNITED STATES PATENTS

| | | |
|---|---|---|
| 2,707,190 | Farrar | Apr. 26, 1955 |
| 2,708,673 | Levin | May 17, 1955 |
| 2,744,110 | Ralls | May 1, 1956 |

OTHER REFERENCES

Fried: J. Am. Chem. Soc. 75, 2273 (1953).
Fried: J. Am. Chem. Soc. 76, 1544-6 (1954).